Sept. 4, 1956  G. E. HOLBROOK  2,761,277
VARIABLE NOZZLE ACTUATOR
Filed Feb. 23, 1952  3 Sheets-Sheet 3

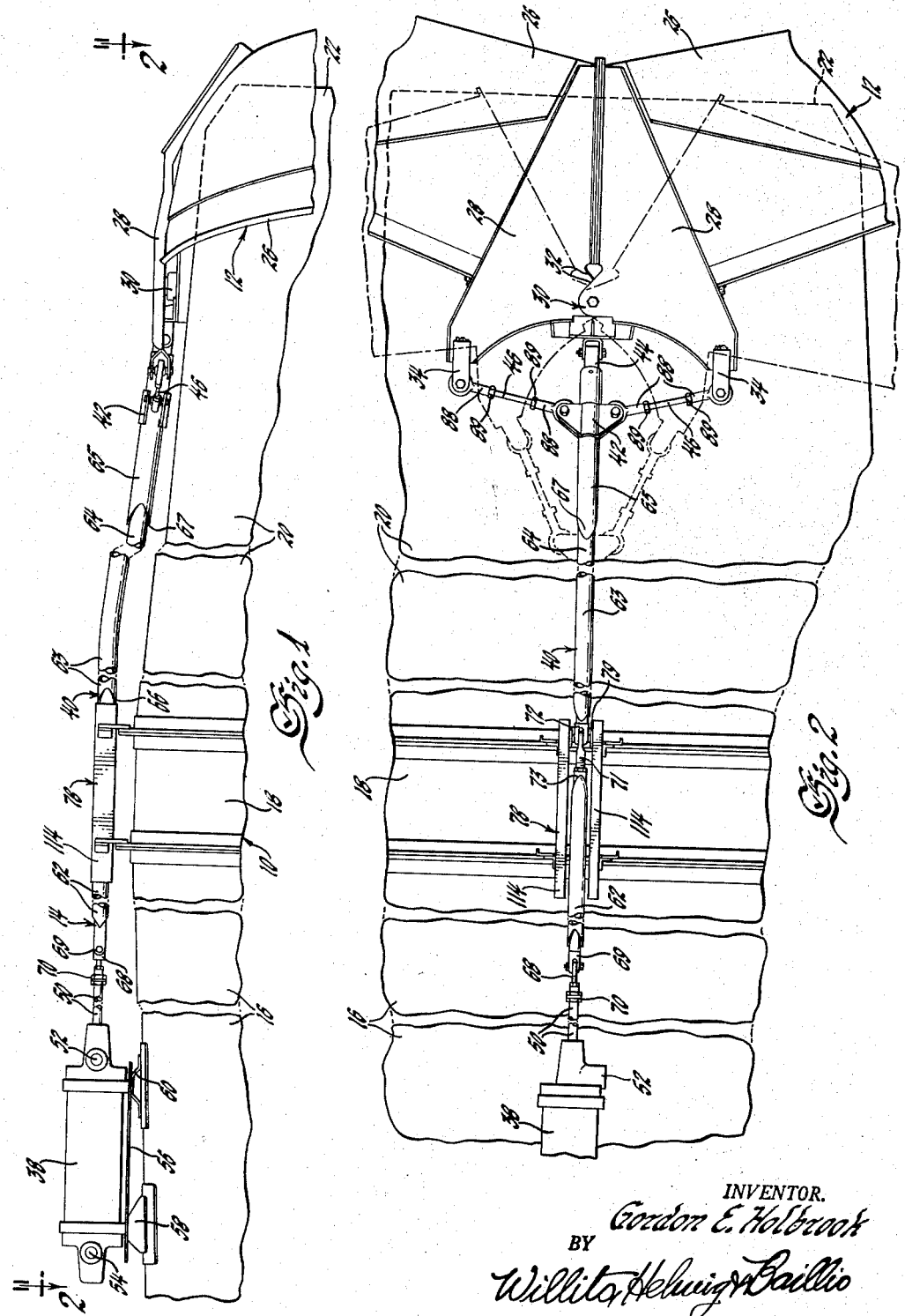

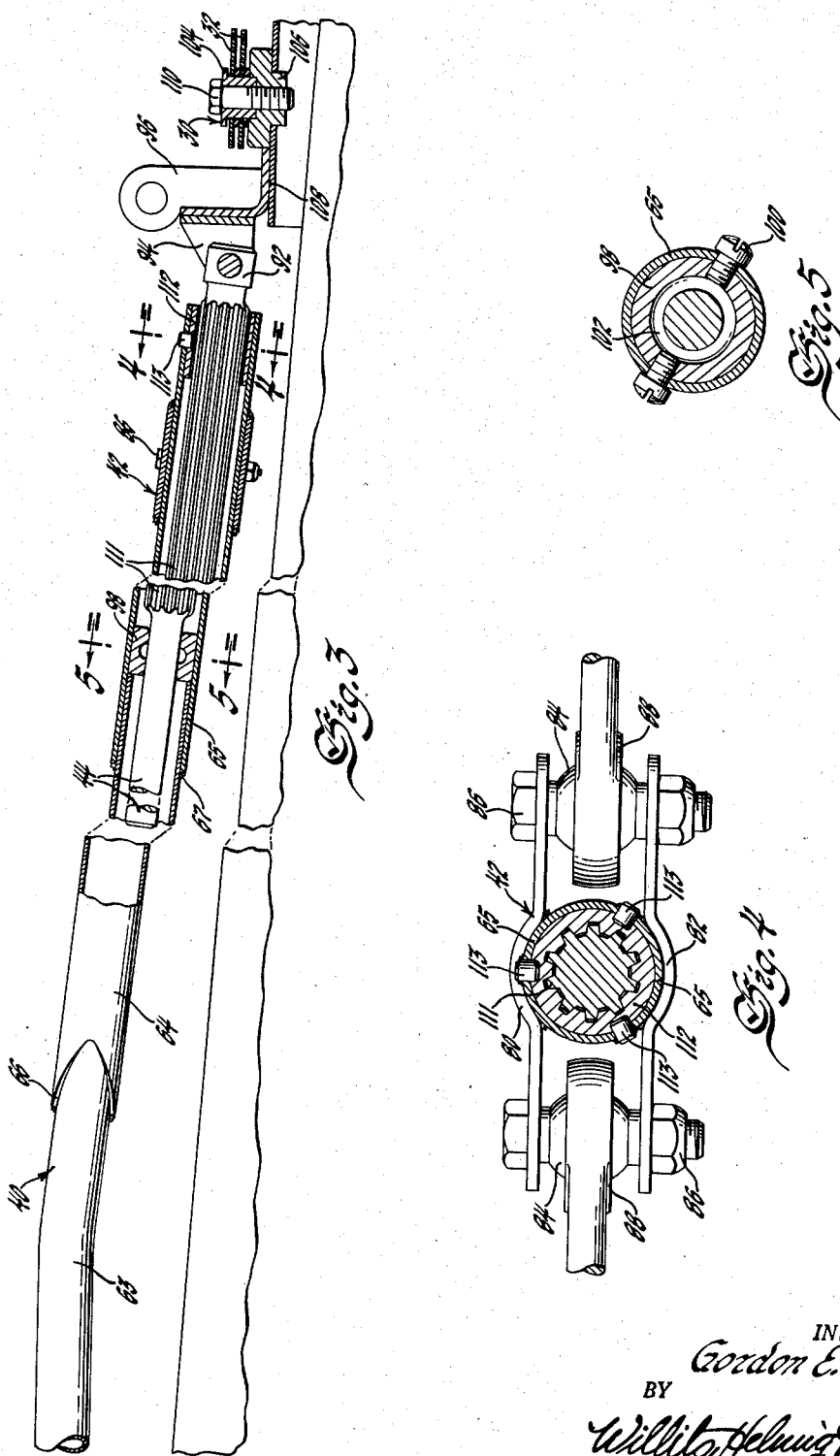

INVENTOR.
Gordon E. Holbrook
BY
Willito, Helnig & Baillio
ATTORNEYS

United States Patent Office 2,761,277
Patented Sept. 4, 1956

2,761,277

VARIABLE NOZZLE ACTUATOR

Gordon E. Holbrook, Indianapolis, Ind., assignor to General Motors Corporation, Detroit, Mich., a corporation of Delaware Application February 23, 1952, Serial No. 273,068

8 Claims. (Cl. 60—35.6)

This invention relates to variable propulsion nozzles for use with jet propulsion engines and, more particularly, to operating mechanisms for actuation of variable area jet nozzle devices.

It has been generally recognized that the operating characteristics of jet propulsion engines, such as gas turbine jet engines, may be improved by the provision of means for varying the area of a jet nozzle, and many structural arrangements for this purpose have been proposed.

The present invention is directed to an improved operating mechanism for the actuation of variable propulsion nozzles of the adjustable valve or visor type commonly employed on afterburner turbojet installations wherein a pair of opposed valves or visors are pivotally mounted on a diameter of a jet pipe to vary the area of the gas jet orifice.

The power for moving the valves or visors, also called the eyelids, may be supplied from a suitable actuator mounted on the jet pipe through an operating mechanism which may include a guided actuator rod driven by the actuator. The actuator rod is coupled to the eyelids through connecting links which are coupled to the actuator rod at points displaced from the axis thereof with the result that the forces supplied to close the eyelids tend to twist the rod and cause binding of the elements of the operating mechanism. Binding of the operating mechanism also is caused by reason of the orientation of the operating mechanism and the eyelids. The connecting links lie in planes at different angles to the axis of the actuator rod for each position thereof, whereby the actuating rod is subjected to twisting moments occasioned by unbalanced loads due to unequal resistance to motion of the eyelids which tend to cause binding of the elements of the operating mechanism.

The invention thus has for its principal object the provision of an improved operating mechanism for a variable area jet nozzle, the construction of which is such as will resist twisting of the actuator rod, whereby binding of the moving parts of the operating mechanism will be obviated. Other objects are to provide a simple, efficient and inexpensive jet nozzle eyelid operating mechanism that is rugged, light in weight and reliable in operation.

Figure 6:
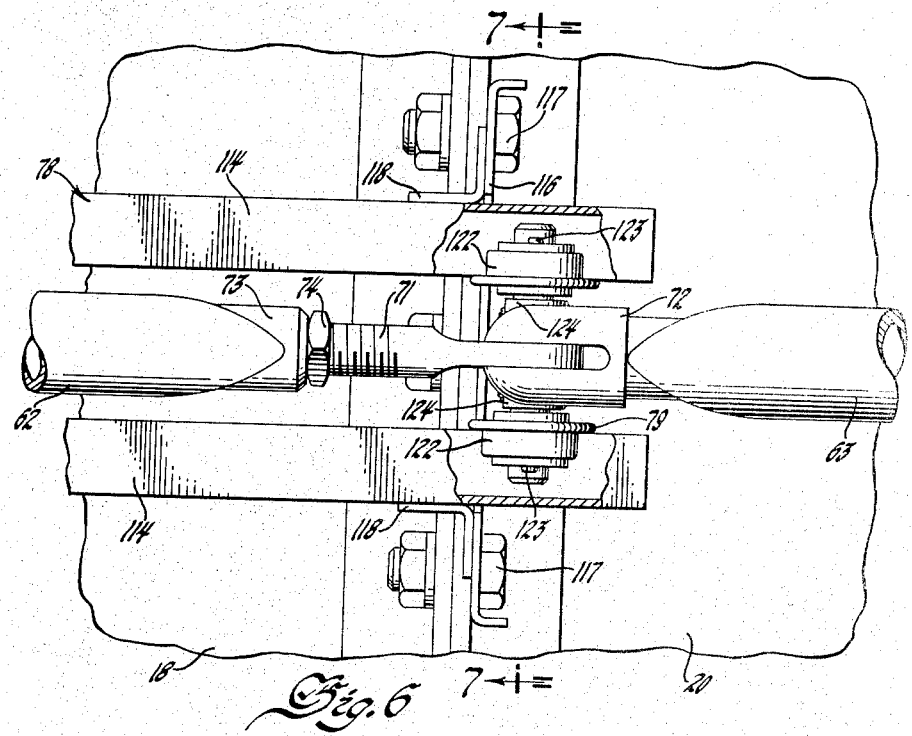
Figure 7:
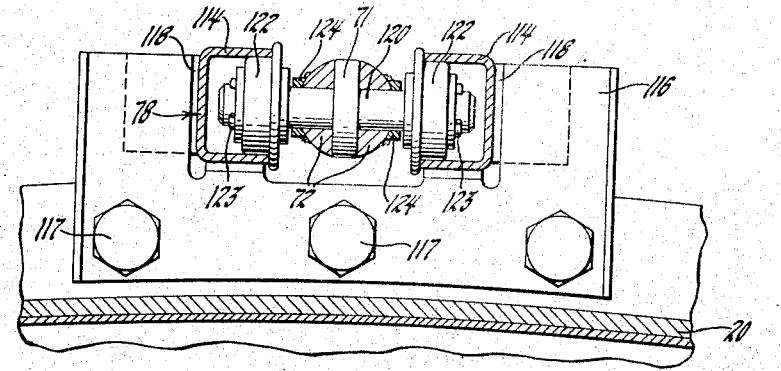

The above and other objects, together with the features and advantages attending the invention, will appear more fully from the following description and drawings, wherein:

Fig. 1 is a broken elevation view of an afterburner installation for a turbojet engine equipped with a variable area jet nozzle and an operating mechanism therefor in accordance with a preferred embodiment of the invention for actuation of a variable area jet nozzle employed on an afterburner installation for a turbojet propulsion engine;
Fig. 2 is a plan view of the structure of Fig. 1 taken in the direction 2—2 thereof; Fig. 3 is a broken elevation view partly in section of a part of the operating mechanism of Fig. 1; Figs. 4 and 5 are transverse sectional views taken in the planes 4—4 and 5—5, respectively, of Fig. 3; Fig. 6 is an enlarged plan view of a part of the operating mechanism of Fig. 1; and Fig. 7 is a transverse sectional view taken in the direction 7—7 of Fig. 6.

Referring to the drawings, Fig. 1 illustrates an afterburner 10 for a turbojet engine equipped with a variable area jet nozzle 12 and an operating mechanism 14 in accordance with a preferred embodiment of the invention. The remainder of the engine is not illustrated because the structure of such engines is well known and the details of the engine are immaterial to the invention.

The afterburner 10 is of a known type, and comprises, in general, an afterburner diffuser section 16, a burner assembly 18, and a combustion section 20 terminating in a fixed converging outlet nozzle 22, all of which are secured together to form an enlongated, substantially barrel-shaped assembly which is fixed to the turbine exhaust pipe of a turbojet engine in known manner.

The variable nozzle 12 is of the known adjustable visor type and comprises, in general, a pair of opposed visors or eyelid members 26 each shaped in the form of a segment of a spherical zone and having a substantially triangular bracket 28 welded or otherwise secured to the ends thereof as shown in Fig. 2. The eyelids 26 are rotatably mounted on pivot arrangements, one of which is indicated at 30, extending through a pair of aligned ears 32 formed in one corner of each eyelid bracket 28.

Brackets 34, formed in or secured to another corner of each of the eyelid brackets 28, are provided to form clevises for attachment thereto of one end of a connecting link 46 which forms a part of the operating mechanism to be described. The pivots 30, which extend from the wall of the section 20 of the afterburner assembly 10, are aligned with a diameter thereof and define on axis of rotation normal to the axis of the engine. The eyelids are shown in their closed position in which the opening between them is a minimum, and may be swung outwardly about the pivots over the fixed nozzle 22 to enlarge the jet nozzle orifice as shown in dashed outline in Fig. 2.

The operating mechanism 14 comprises a pair of actuating assemblies (only one of which is shown) which are mounted on opposite sides of the afterburner assembly 10. Each of the actuating assemblies comprises a motor 38, a thrust or connecting rod assembly 40, a fitting 42 secured to the rod 40, a fixed inner guide rod 44 (Fig. 3), and a pair of toggle connecting links 46 connected between the fitting 42 and brackets 34 of the eyelid members 26.

The actuator motor 38 is preferably of the cylinder and piston type, the piston rod 50 of which extends through one end of the cylinder. Ports 52 and 54 at opposite ends of the cylinder are provided for the purpose of supplying air or other fluid thereto to move the piston. The cylinder 38 is mounted on a heat shield 56 that is spaced and supported from the hot shell of the afterburner diffuser section 16 by saddle support brackets 58 and 60 as shown in Fig. 1.

As best shown in Fig. 2, the thrust rod 40 is an assembly composed of several sections of rod, a straight forward section 62, a bent mid-section 63, and a straight rear portion formed by successive tubular sections 64, 65. The sections 63, 64 and 65 are united by welded scarf joints 66, 67 (Figs. 1 and 3). The forward section 62 may be of tubular form and is flexibly connected with the piston rod 50 of the motor 38 by an eye and clevis joint 68, 69, the eye 68 of which is threaded into the end of the piston rod 50 and the clevis 69 welded or otherwise secured to the forward end of the rod section 62. Two hexagon nuts 70 are provided on the end of the piston rod to limit the forward stroke of the piston. The bent mid-section 63 of the rod assembly may also be of tubular form and is flexibly connected with the forward section 62 by an eye and clevis joint 71, 72 (Fig. 6) that is guided in a track and roller arrangement 78, 79, the construction and purpose of which will be described. The eye 71 is threaded into the end of a threaded nipple 73 (Fig. 6) welded to the end of the rod section 62 and locked thereto by a jam nut 74 while the clevis 72 is welded to the adjacent end of the mid-section 63 of the thrust rod assembly as shown.

The fitting 42 is preferably welded to the rear section 65 of the thrust rod assembly. As shown in Fig. 4, the fitting comprises a pair of spaced laterally extending plates 80 and 82 welded to opposite sides of the tubular rod section 65 to form a pair of clevises, each of which receives a ball joint 84 connected thereto by a bolt and nut 86 as shown. Each of the ball joints 84 is associated with a socket formed by an eye fitting 88 provided at each of the threaded ends of the connecting links 46 of Fig. 2. Similar ball joint fittings are provided between the brackets 34 on the eyelids 26 and the connecting links 46. The connecting links 46 are threaded into the ends of the eye fittings 88 which are locked thereto by jam nuts 89 (Fig. 1). Adjustments of the length and position of the thrust rod assembly and connecting links are facilitated by the threaded fittings employed therein.

As best shown in Figs. 3 and 4, the inner rod 44 of the actuating assembly is coaxial with and extends into so as to telescope within the interior of the tubular rear section 65 of the thrust rod. The inner rod 44 has an integrally formed head 92 at one end thereof attached to a clevis 94 on a bracket 96 adjacent the eyelid pivot arrangement 30. The forward end of the fixed inner rod passes centrally through a pilot bushing 98 (Figs. 3 and 5) within the interior of the rear section 65 of the actuator or thrust rod assembly so as to aid in guiding the latter in its longitudinal movement relative thereto. The bushing 98, which is preferably of a graphite composition, is secured within the rear section 65 of the actuator rod by cap screws 100 and is formed with an annular groove 102.

The pivot arrangement for the eyelids is best shown in Fig. 3. Each of the pivot arrangements comprises a flanged sleeve 104 which passes through the ears 32 of the eyelid brackets 28 and is received in a recess in a nut 106 that is welded to a raised channel platform member 108 welded to or formed in the surface of the afterburner combustion section 20 and serves to provide a plane mounting surface for the eyelid pivots parallel to the axis of the engine. The sleeve 104 is inserted with the eyelids assembled in place as shown and is retained by a bolt 110 which passes through the sleeve and is received in the nut 106. The support bracket 96 is welded to the platform member 108 so as to be integrally connected with the eyelid pivot.

Since the connecting links 46 are coupled to the fittings 42 at points displaced from the axis of the rod section 65, the forces required to close the eyelids tend to twist the fitting 42 and rod section 65 around the axis of the tubular shaft. To prevent such twisting, interengaging means of complementary cross-section, preferably in the form of a spline 111 (Fig. 3) formed on the fixed inner rod 44 and a splined bushing 112 secured in the end of the thrust rod section 65, are provided between the guide rod 44 and the movable outer rod assembly. The splined bushing 112 may be fixed in the rod section 65 by dowel pins 113 extending therebetween as shown in Fig. 4. By reason of the shape of the interengaging portions of the outer and inner rods, they are positively interlocked against relative rotary movement but not against relative longitudinal movement. Smooth and reliable operation of the operating mechanism is thus insured and binding of the elements of the operating mechanism is eliminated.

The aforementioned track and roller arrangement 78, 79 is provided to guide the junction between the forward section 62 and the inclined mid-section 63 of the actuator rod assembly and to prevent radial and transverse bending or buckling of the thrust rod assembly. The track comprises a pair of laterally spaced channels 114 supported near both ends thereof by a pair of longitudinally spaced support plates 116 that are suitably secured as by the bolts 117 to the flanges at the ends of the burner section 18 of the afterburner assembly. The outer central portion of each support plate is cut out as shown to permit the channels 114 to extend therethrough. The tracks are secured to the support plate by angle brackets 118 which are welded to the web of each channel track 114 and to the support plate 116.

The roller arrangement comprises a transverse pin 120 (Fig. 7), which extends through the eye 71 and clevis 72 of the articulated joint between the forward and mid-sections 62, 63 of the thrust rod assembly so as to be journaled therein, and a pair of flanged rollers 122 rotatably mounted on opposite ends of the pin 120 and maintained thereon by cotter pins 123 as shown in Figs. 6 and 7. The pin 120 passes through a pair of short sleeves or bushings 124 (Fig. 6) welded to opposite sides of the clevis 73 which serve to prevent lateral displacement of the actuator rod assembly. The rollers are mounted to coact with the flanges of the channel tracks 114 as shown in Fig. 7, so that radial and lateral forces are taken by the track to hold the thrust rod sections in proper alignment.

There is thus provided a lightweight operating mechanism that is appropriately supported and guided so wherein side thrust on the piston of the actuating motor tending to cause binding of the movable parts of the operating mechanism and wherein radial and transverse forces tending to cause buckling and deflection of the thrust rod are eliminated.

It is to be understood that the above described arrangement is but illustrative of the application of the principles of the invention and that numerous other arrangements may be devised by those skilled in the art without departing from the spirit and scope of the invention.

I claim:

1. In combination, a reciprocable drive motor having a movable part and a stationary part, pivot means spaced from said motor, means movable by said motor rotatably mounted on said pivot means, an actuator rod coupled to said movable part of said motor, a fixed guide member extending forwardly from the pivot means and terminating in spaced relation from the said stationary part of said motor, said fixed guide member being supported from said pivot means against rotary movement and being extensibly coupled to said actuator rod for relative longitudinal movement therebetween, and a guideway on said guide member slidably engaging said actuator rod and restraining said rod against relative rotary movement.

2. In combination, a reciprocable drive motor having a casing and a part reciprocable thereof, pivot means spaced from said motor, means movable by said motor rotatably mounted on said pivot means, a tubular actuator rod coupled to the said reciprocable part of said motor, a fixed guide member having one end secured against rotary movement to said pivot means and its other end terminating in spaced relation from the said casing of said motor and extensibly coupled to said actuator rod for relative longitudinal movement therebetween, and a longitudinal guideway having lateral sidewalls on said guide member engaging said actuator rod for restraining said rod against relative rotary movement on said guide member.

3. In apparatus including a jet pipe terminating in an outlet nozzle, pivot means adjacent the outlet nozzle and defining an axis of rotation normal to the axis of said pipe, at least two adjustable visor members constituting a variable area nozzle rotatably mounted on said pivot means and means for actuating the visor members including actuator means spaced forwardly of the pivot means and having a first part mounted on the pipe and a second part movable longitudinally thereof; the combination with said actuator means wherein said actuating means comprises an actuator rod coupled to the said movable part of said actuator means, a fixed guide member extending forwardly from said pivot means and terminating in spaced relation from the said first part of said actuator means, said fixed guide member being supported against rotary movement about the axis of said pipe and extensibly coupled to said actuator rod for relative longitudinal movement therebetween, a guideway on said guide member slidably engaging said actuator rod and restraining the rod against relative rotary movement, and means connecting said actuator rod to the adjustable visor members.

4. In apparatus including a jet pipe terminating in an outlet nozzle, pivot means adjacent the outlet nozzle and defining an axis of rotation normal to the axis of said pipe, at least two adjustable visor members constituting a variable area nozzle rotatably mounted on said pivot means and means for actuating the visor members including reciprocable actuator means spaced forwardly of the pivot means and having a casing mounted on the pipe and a part reciprocable longitudinally thereof; the combination with said actuator means wherein said actuating means comprises an actuator rod coupled to the said reciprocable part of said actuator means, a fixed guide member extending forwardly from said pivot means and terminating in spaced relation from the said casing of said actuator means, said fixed guide member being secured to said pivot means against rotary movement about the axis of said pipe and being extensibly coupled to the said actuator rod for relative longitudinal movement therebetween, a guideway on said guide member slidably engaging said actuator rod and restraining said rod against relative rotary movement, a pilot bushing between said actuator rod and guide member, and means connecting said actuator rod to the adjustable visor members.

5. In apparatus including a jet pipe terminating in an outlet nozzle, pivot means adjacent the outlet nozzle and defining an axis of rotation normal to the axis of said pipe, at least two adjustable visor members constituting a variable area nozzle rotatably mounted on said pivot means and means for actuating the visor members including reciprocable actuator means spaced forwardly of the pivot means and having a casing mounted on the pipe and a part reciprocable longitudinally thereof; the combination with said actuator means wherein said actuating means comprises an actuator rod coupled to the said reciprocable part of said actuator means, a fixed guide member extending forwardly from the said pivot means and terminating in spaced relation from the said casing of said actuator means, said fixed guide member being secured to said pivot means against rotary movement about the axis of said pipe and being extensibly coupled to said actuator rod for relative longitudinal movement therebetween, a guideway on said guide member and means on said actuator rod slidable longitudinally in said guideway and restraining the rod against relative rotary movement, and means connecting said actuator rod to the adjustable visor members.

6. In apparatus including a jet pipe terminating in an outlet nozzle, pivot means extending from said pipe adjacent the outlet nozzle thereof and defining an axis of rotation normal to the axis of the pipe, at least two adjustable visor members constituting a variable area nozzle rotatably mounted on said pivot means and means for actuating the visor members including actuator means spaced forwardly of the pivot means and having a casing mounted on the pipe and a part reciprocable longitudinally thereof; the combination with said actuator means wherein said actuating means comprises a tubular actuator rod coupled to the said reciprocable part of said actuator means, a fixed inner guide member extending forwardly from the said pivot means, one end of said guide member being secured to said pivot means against rotary movement about the axis of said pipe and the other end terminating in spaced relation from the said casing of said actuator means, the said other end of said guide member telescoping in said actuator rod for relative longitudinal movement therebetween, means locking said actuator rod and guide member against relative rotary movement including a guideway on said guide member slidably engaging said actuator rod, and means connecting said actuator rod to the adjustable visor members.

7. In apparatus including a jet pipe terminating in an outlet nozzle, pivot means extending from said pipe adjacent the outlet nozzle thereof and defining an axis of rotation normal to the axis of the pipe, at least two adjustable visor members constituting a variable area nozzle rotatably mounted on said pivot means and means for actuating the visor members including actuator means spaced forwardly of the pivot means and having a first part mounted on the pipe and a second part movable longitudinally thereof; the combination with said actuator means wherein said actuating means comprises a tubular actuator rod coupled to the said movable part of said actuator means, a fixed inner guide member extending forwardly from said pivot means and terminating in spaced relation from the said first part of said actuator means, said fixed guide member being supported from said pivot means against rotary movement about the axis of said pipe and being extensibly received in said actuator rod for relative longitudinal movement therebetween, said guide member and said actuator rod being longitudinally splined for preventing relative rotary movement therebetween, and means connecting said actuator rod to the adjustable visor members.

8. In combination, a drive motor having a movable part and a stationary part, pivot means spaced from said motor, means movable by said motor rotatably mounted on said pivot means, an actuator rod coupled to said movable part of said motor, a guide member secured to said pivot means and extensibly coupled to said actuator rod for relative longitudinal movement therebetween, and a guideway on said guide members slidably engaging said actuator rod and restraining said rod against relative rotary movement.

References Cited in the file of this patent
UNITED STATES PATENTS

| | | |
|---|---|---|
| 762,627 | Fink | June 14, 1904 |
| 2,523,842 | Oulianoff | Sept. 26, 1950 |
| 2,551,372 | Haltenberger | May 1, 1951 |